United States Patent [19]

Fabbri

[11] Patent Number: 4,991,762
[45] Date of Patent: Feb. 12, 1991

[54] BAR GUIDING DEVICE FOR BAR FEEDERS OF MACHINE TOOLS

[75] Inventor: Vladimiro Fabbri, Faenza, Italy

[73] Assignee: I.E.M.C.A. S.p.A. Industria Elettromeccanica, Faenza, Italy

[21] Appl. No.: 322,133

[22] Filed: Mar. 13, 1989

[30] Foreign Application Priority Data

Mar. 18, 1988 [IT] Italy .................. 3384 A/88

[51] Int. Cl.⁵ .................. B65H 51/00; B23B 13/00
[52] U.S. Cl. .................. 226/182; 82/127; 226/108; 226/190
[58] Field of Search .................. 226/182, 108, 190; 82/127, 163, 162; 267/266, 22

[56] References Cited

U.S. PATENT DOCUMENTS

| 2,043,481 | 6/1936 | Krissiep et al. | 82/162 X |
| 2,050,049 | 8/1936 | Findlater | 226/190 X |
| 2,053,009 | 9/1936 | Schmidt | 82/162 X |
| 2,747,727 | 5/1956 | Morain | 226/108 X |
| 3,589,580 | 6/1971 | Smulders | 226/108 |

FOREIGN PATENT DOCUMENTS

| 2823044 | 6/1979 | Fed. Rep. of Germany | 82/163 |
| 536872 | 9/1976 | U.S.S.R. | 226/182 |

Primary Examiner—Daniel P. Stodola
Assistant Examiner—Paul T. Bowen
Attorney, Agent, or Firm—Guido Modiano; Albert Josif

[57] ABSTRACT

The present invention relates to a bar guiding device for bar feeders of machine tools. The device is composed of at least one group of wheels angularly distributed around the bar and rotatably supported so as to be peripherally in contact with the bar.

11 Claims, 2 Drawing Sheets

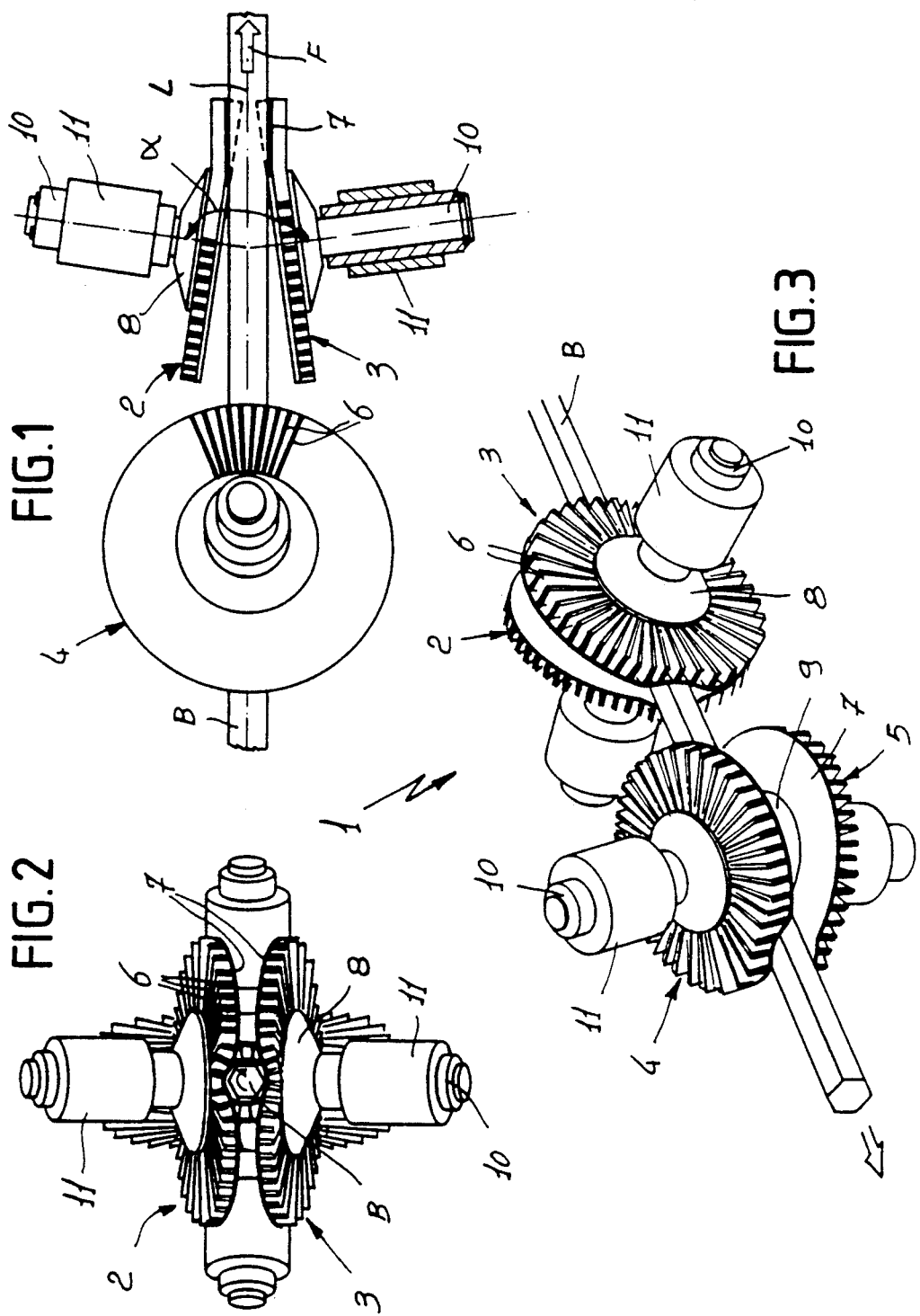

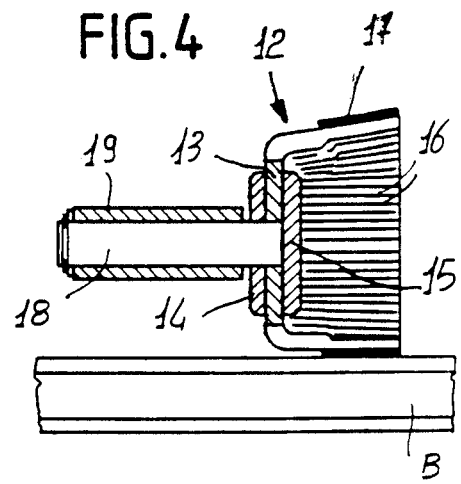
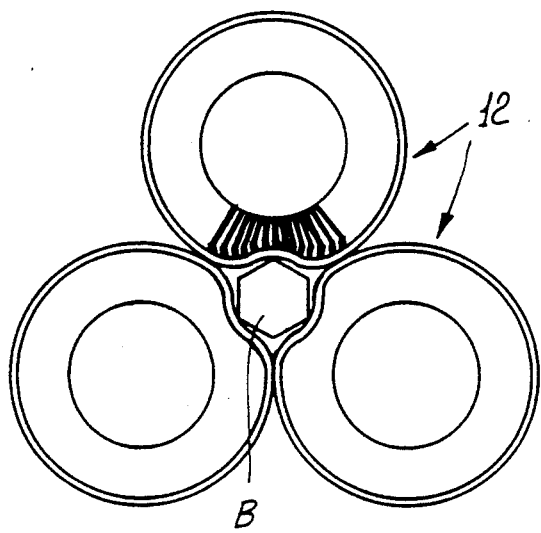
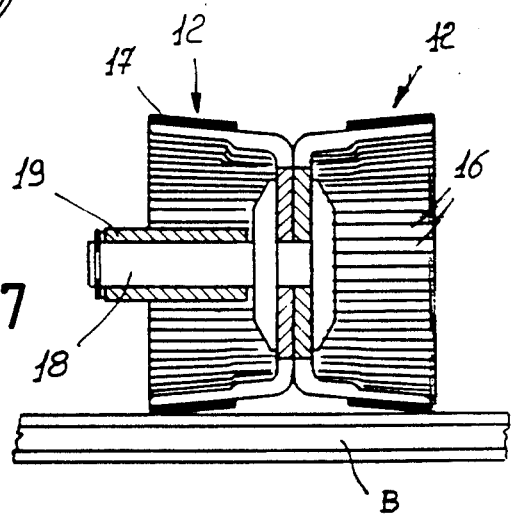
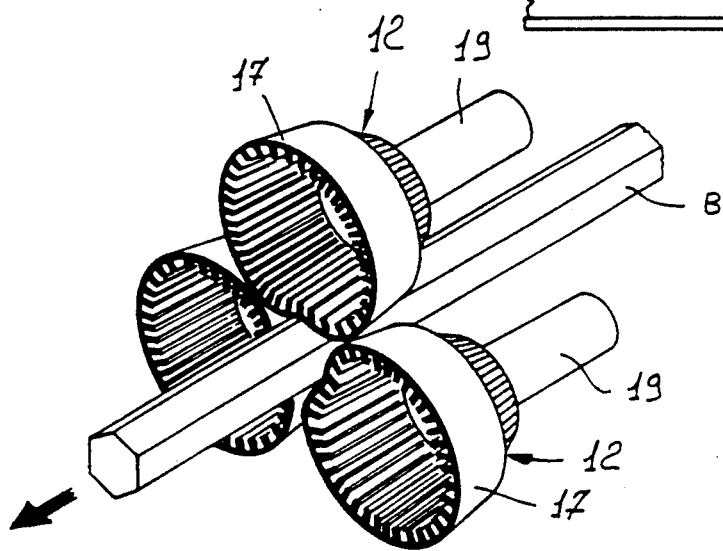

BAR GUIDING DEVICE FOR BAR FEEDERS OF MACHINE TOOLS

BACKGROUND OF THE INVENTION

The present invention relates to a bar guiding device for bar feeders of machine tools.

As is known, in the field of mechanical machining it is necessary to guide rotating bars. For this purpose appropriate guiding channels are provided, but they have the disadvantage that they can work with bars of only a set diameter and furthermore cause the bars to wear due to the scraping of the bars on the walls of the channels.

Besides this, especially polygonal bars generate noise and vibrations, and in general it is difficult to mount the bars in the guide.

SUMMARY OF THE INVENTION

The aim of the present invention is to obviate the described disadvantages by providing a device that guides rotating bars without mutual scraping.

Within the scope of this aim, a further object of the invention is to provide a device which is simple in concept, easy to use and reliable in operation, as well as versatile in relation to the different cross sections of the bars being machined.

This aim and this object are both achieved, according to the invention, by the present bar guiding device, which is characterized in that it comprises at least one group of wheels which are angularly distributed around the bar and are rotatably supported so as to be peripherally in contact with said bar.

BRIEF DESCRIPTION OF THE DRAWINGS

Further features and advantages of the invention will become apparent from the detailed description of some preferred embodiments, illustrated only by way of non-limitative example in the accompanying drawings, wherein:

FIG. 1 is a side view of a first embodiment of the device according to the invention;

FIG. 2 is an axial view thereof;

FIG. 3 is an isometric view;

FIG. 4 is a partially sectional side view of a further embodiment of the device;

FIG. 5 is an axial view;

FIG. 6 is an isometric view of said device;

FIG. 7 is a side view of a third embodiment, shown in longitudinal cross section.

DESCRIPTION OF THE PREFERRED EMBODIMENTS

With reference to FIGS. 1-3, the device, generally indicated by the reference numeral 1, comprises a group of wheels, composed of two pairs of flexible disks 2, 3 and 4, 5.

Each disk is in fact constituted by a circular plate of resilient material such as rubber, in which several radial notches define corresponding several laminas or fingers 6 arranged along a crown and mutually connected by a layer 7 of a material which has particular resistance to wear and is flexible as well. The layer 7 is applied to the fingers 6 by glueing, vulcanization or by any other suitable means.

Each disk is secured between a pair of flanges 8, 9 mounted on a shaft 10 which is rotatably supported in supports 11 rigidly associated with fixed parts of a frame (not illustrated).

The shafts 10 related to the disks 2, 3 are arranged on a same plane. The shafts related to the disks 4, 5 are similarly arranged in a same plane which is however perpendicular to the plane of the shafts of the disks 2, 3. The intersection line of the two planes is indicated by L and coincides with the axis along which the bars B to be machined are advanced.

The shafts of the disks 2, 3 and 4, 5 are not coaxial but define an obtuse angle α vertex whereof is arranged on the line L and is directed opposite to the direction F along which the bars B are fed. In this manner the rims of the two disks 2, 3 and 4, 5 are more spaced on one side than on the diametrically opposite side.

The distance between the opposite disks of each pair is chosen so that the nearest portions of the disks 2, 3 and 4, 5 are almost in tangential contact.

By virtue of the above described arrangement of each group 1 of wheels, the bar B to be machined, once inserted between the disks 2-5, is gripped therebetween in orthogonally opposite positions and is guided in the machining direction F. It should be noted that the disks 2-5 are rotated with the same peripheral speed as they partially embrace the bar. No scraping therefore occurs between the touching surfaces of the bar and of the disks, and wear is thus significantly reduced. Vibrations caused by machining or by irregularities in the rotating bars are furthermore effectively eliminated.

An advantage of the present invention resides in the fact that by adjusting the distance between the opposite disks it is possible to support bars with different diameters or cross section.

In the embodiment of FIGS. 4-6, each bar supporting assembly is constituted by a set of three cups 12 made of flexible material which are rotatably supported along axes parallel to the bar B being machined. More precisely, each cup 12 comprises a bottom 13, secured between a pair of flanges 14, 15, and a cylindrical wall composed of a plurality of laminas or fingers 16 around which a band 17 of material similar to that of the above mentioned layer 7 is wound. By means of the flanges 14, 15 the cup 12 is mounted on a shaft 18 supported by a bearing 19 so as to rest with the band 17 on the bar being machined. The cups 12 of the set of three therefore support the bar B at three points which are angularly offset by 120 degrees.

The cups 12 can be arranged in a plane which is transverse to the bar B, or they can be axially distributed. This last solution is preferable to allow the support of thin bars without causing the mutual contact of the cups.

Finally, in the embodiment illustrated in FIG. 7 two opposite cups 12 are mounted on each shaft 18, offering greater longitudinal support to the bar.

Further modifications and variations, all within the scope of the present protection, are possible in the practical embodiment of the invention. For example, the shafts 10 and 18 are mounted so that they can be spaced further from, or moved closer to, the axis L, allowing to adjust the wheels with respect to the bar according to its gauge. One or more of said wheels can furthermore be spaced to insert the bars between the guiding wheels.

I claim:

1. Guiding device for bars comprising at least one group of wheels, each wheel comprised in said at least one group of wheels having a flexible contact portion, said each wheel being rotatably supportable and angularly arrangeable about one bar, said flexible contact portion of said each wheel thereby being arrangeable in flexible supporting contact with the bar, said flexible contact portion comprising a flexible planar surface arrangeable in contact with the bar and a plurality of protruding fingers on an opposite side from the flexible planar surface, each protruding finger being laterally spaced apart from one another thereby defining a plurality of radial notches therebetween.

2. Device according to claim 1, wherein each wheel comprised in said at least one group of wheels is movable relative to one another, said at least one group of wheels being thereby adaptable to support bars of different gauges.

3. Device according to claim 1, wherein one group of said at least one group of wheels is constituted by four wheels, a first wheel of said four wheels being mounted on one end of said first shaft having a first shaft axis, a second wheel of said four wheels being mounted on one end of a second shaft having a second shaft axis, a third wheel of said four wheels being mounted on one end of a third shaft having a third shaft axis, a fourth wheel of said four wheels being mounted on one end of a fourth shaft having a fourth shaft axis, said first shaft axis, said second shaft axis, said third shaft axis, and said fourth shaft axis being arranged such that said first shaft axis and said second shaft axis lie in a first plane which is orthogonal to a second plane in which lie said third shaft axis and said fourth shaft axis and an intersection line formed by an intersection of the first plane and the second plane substantially corresponds to a longitudinal axis of the supported bar.

4. Device according to claim 3, wherein each wheel of said four wheels is constituted by a disk, said flexible planar surface of said flexible contact portion of said disk being constituted by a flexible circular plate, said plurality of protruding fingers being radially arranged about said flexible circular plate on one side opposite to said flexible planar surface which is arrangeable to face the bar, said disk being made of wearresistant material.

5. Device according to claim 3, wherein said first shaft axis, said second shaft axis, said third shaft axis, and said fourth shaft axis are arranged such that a first obtuse angle is defined between said first shaft axis and said second shaft axis and a second obtuse angle is defined between said third shaft axis and said fourth shaft axis, said first obtuse angle and said second obtuse angle both having vertexes lying on a longitudinal axis of the supported bar, said first obtuse angle and said second obtuse angle both opening in a direction of feeding of the supported bar.

6. Device according to claim 3, wherein said first shaft axis, said second shaft axis, said third shaft axis, and said fourth shaft axis are arranged such that a first obtuse angle is defined between said first shaft axis and said second shaft axis and a second obtuse angle is defined between said third shaft axis and said fourth shaft axis, said first obtuse angle and said second obtuse angle both having vertexes lying on a longitudinal axis of the supported bar, said first obtuse angle and said second obtuse angle both opening in a direction of feeding of the supported bar, each wheel of said four wheels being constituted by a disk, said flexible planar surface of said flexible contact portion of said disk being constituted by a flexible circular plate, said plurality of protruding fingers being radially arranged about said flexible circular plate on one side opposite to said flexible planar surface which is arrangeable to face the bar, said disk being made of wear-resistant material.

7. Device according to claim 3, wherein said first shaft axis, said second shaft axis, said third shaft axis, and said fourth shaft axis are arranged such that a first obtuse angle is defined between said first shaft axis and said second shaft axis and a second obtuse angle is defined between said third shaft axis and said fourth shaft axis, said first obtuse angle and said second obtuse angle both having vertexes lying on a longitudinal axis of the supported bar, said first obtuse angle and said second obtuse angle both opening in a direction of feeding of the supported bar, each wheel of said four wheels being constituted by a disk, said flexible planar surface of said flexible contact portion of said disk being constituted by a flexible circular plate, said plurality of protruding fingers being radially arranged about said flexible circular plate opposite to said flexible planar surface which is arrangeable to face the bar, said disk being made of wearresistant material, said first shaft axis, said second shaft axis, said third shaft axis, and said fourth shaft axis being arranged so that said first wheel and said second wheel are tangentially arranged to said third wheel and said fourth wheel at circular circumferences thereof.

8. Device according to claim 1, wherein one group of said at least one group of wheels is constituted by three wheels, a first wheel of said three wheels being mounted on one end of a first shaft having a first shaft axis, a second wheel of said three wheels being mounted on one end of a second shaft having a second shaft axis, a third wheel of said three wheels being mounted on one end of a third shaft having a third shaft axis, said first shaft axis, said second shaft axis and said third shaft axis being parallel to a longitudinal axis of the supported bar and being arranged 120 degrees apart around the bar.

9. Device according to claim 8, wherein each wheel of said three wheels is constituted by a cup-like element, said flexible planar surface of said flexible contact portion of said cup-like element being constituted by a flexible cylindrical wall, said flexible cylindrical wall defining an axis being substantially parallel to a longitudinal axis of the supported bar, said plurality of protruding fingers being radially arranged inside said flexible cylindrical wall opposite to the flexible planar surface arranged on the outside of said flexible cylinder wall which is arrangeable to face the bar.

10. Device according to claim 8, wherein each wheel of said three wheels is constituted by a cup-like element, said flexible planar surface of said flexible contact portion of said cup-like element being constituted by a flexible cylindrical wall, said flexible cylindrical wall defining an axis being substantially parallel to a longitudinal axis of a supported bar, said plurality of protruding fingers being radially arranged inside said flexible cylindrical wall opposite to the flexible planar surface arranged on the outside of said flexible cylinder wall which is arrangeable to face the bar, an additional cup-like element being coaxially associated with said cup-like element for said each wheel of said three wheels, each said cup-like element being made of wear resistant material.

11. A guiding device, particularly for bars, said guiding device comprising a plurality of rotatable wheels, each wheel of said plurality of rotatable wheels being connected to a rotatable shaft, said each wheel having a flexible contact portion, said flexible contact portion comprising a flexible planar layer and a plurality of protruding fingers, said flexible planar layer having a first side and a second side, said plurality of fingers protruding from said first side of said flexible planar layer and being laterally spaced apart on said first side of said flexible planar layer thereby defining a plurality of radial notches therebetween, said plurality of rotatable wheels being arranged so that at least a small region of said second side of said flexible planar region of at least two of said each wheel is in supporting contact with at least one bar.

* * * * *